United States Patent
Kraft et al.

(10) Patent No.: US 8,429,021 B2
(45) Date of Patent: Apr. 23, 2013

(54) METHOD AND SYSTEM FOR RECEIVING AN ITEM DURING A PRECIOUS STONE AND METAL APPRAISAL

(75) Inventors: Roger E. Kraft, Fort Scott, KS (US); William R. Russell, Pittsburg, KS (US); Rachel E. Wells, Fort Scott, KS (US); Jesse D. Crum, Fort Scott, KS (US)

(73) Assignee: Ward Kraft, Inc., Fort Scott, KS (US)

( * ) Notice: Subject to any disclaimer, the term of this patent is extended or adjusted under 35 U.S.C. 154(b) by 27 days.

(21) Appl. No.: 13/245,427

(22) Filed: Sep. 26, 2011

(65) Prior Publication Data

US 2012/0016725 A1    Jan. 19, 2012

Related U.S. Application Data

(63) Continuation-in-part of application No. 11/901,185, filed on Sep. 14, 2007, now Pat. No. 8,036, 951.

(60) Provisional application No. 61/532,396, filed on Sep. 8, 2011.

(51) Int. Cl.
*G06Q 30/00* (2012.01)

(52) U.S. Cl.
USPC ....................................................... 705/26.1

(58) Field of Classification Search ................. 705/26.1, 705/27.1
See application file for complete search history.

(56) References Cited

U.S. PATENT DOCUMENTS

| 5,983,200 | A | 11/1999 | Slotznick | |
|---|---|---|---|---|
| 6,535,294 | B1 | 3/2003 | Arledge, Jr. et al. | |
| 7,216,092 | B1 | 5/2007 | Weber et al. | |
| 7,343,320 | B1 | 3/2008 | Treyz et al. | |
| 7,844,547 | B2 | 11/2010 | Amos | |
| 2006/0259373 | A1 | 11/2006 | Perrier et al. | |
| 2008/0252917 | A1 | 10/2008 | Kuroda et al. | |
| 2009/0192938 | A1* | 7/2009 | Amos .............................. | 705/43 |
| 2011/0047062 | A1* | 2/2011 | Kerschner et al. .............. | 705/37 |

FOREIGN PATENT DOCUMENTS

WO    WO2008118182 A2    10/2008

OTHER PUBLICATIONS

Jun. 2010—http://www.luxist.com/2010/06/04/gold-vending-machines-land-in-las-vegas/.*
CVS to Offer Mobile Camera Phone Image Printing, Business Wire, Dec. 3, 2003.

* cited by examiner

*Primary Examiner* — Matthew Zimmerman
(74) *Attorney, Agent, or Firm* — Lathrop & Gage LLP

(57) ABSTRACT

A method for appraising at a retail location an item having one of a precious stone, a semi-precious stone, a precious metal, or a semi-precious metal includes the step of providing a variety of food products at the retail location. Then, by a transaction point computer at the retail location, the item to be appraised is received, along with the consumer's selection of a food product. The item's composition is determined using an evaluating device, and an exchange value is associated with the item using data obtained by the evaluating device and market data obtained over a network. The exchange value of the item is relayed to the consumer after the food product selected by the consumer has been delivered.

19 Claims, 8 Drawing Sheets

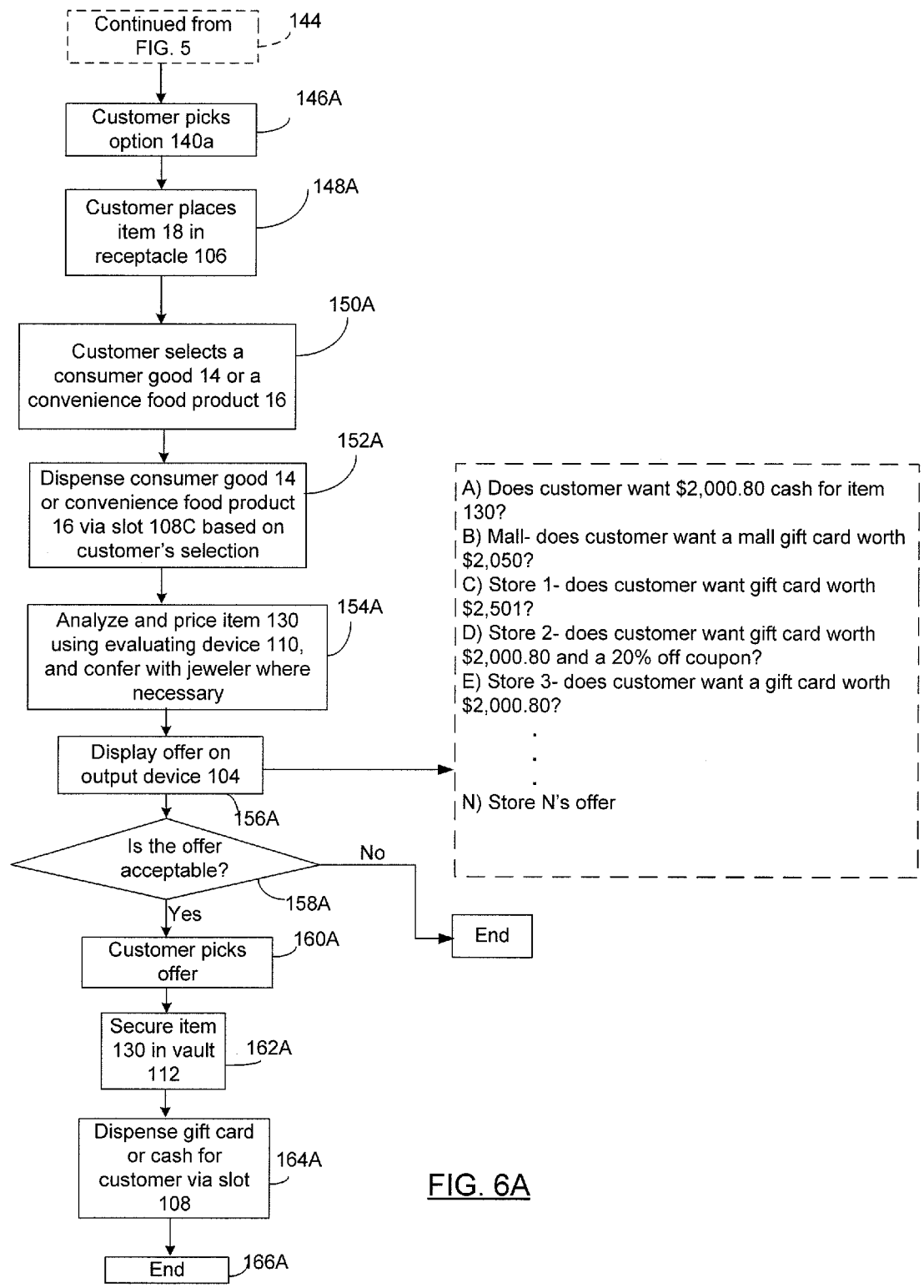

METHOD AND SYSTEM FOR RECEIVING AN ITEM DURING A PRECIOUS STONE AND METAL APPRAISAL

CROSS-REFERENCES TO RELATED APPLICATIONS

This application claims priority to U.S. Provisional Application 61/532,396, filed Sep. 8, 2011 and this application is also a continuation-in-part of U.S. application Ser. No. 11/901,185, filed Sep. 14, 2007 now U.S. Pat. No. 8,036,951.

FIELD OF THE INVENTION

The present invention relates to a combination retailing system providing a series of consumer goods, precious or semi-precious stones and metals, and a selection of ready to eat convenience food products. The combination retailing system further provides an avenue for customers to have their precious or semi-precious stones and metals appraised. The customers may, after this appraisal, choose to trade or sell their precious or semi-precious stones and metals via the combination retailing system.

BRIEF SUMMARY OF THE INVENTION

The disclosed embodiments include systems and methods for appraising items having a precious stone, a semi-precious stone, a precious metal, or a semi-precious metal. According to one embodiment, a method for appraising an item at a retail location includes the step of providing a variety of food products at the retail location. Then, by a transaction point computer at the retail location, the item to be appraised is received, along with the consumer's selection of a food product. The item's composition is determined using an evaluating device, and an exchange value is associated with the item using data obtained by the evaluating device and market data obtained over a network. The exchange value of the item is relayed to the consumer after the food product selected by the consumer has been delivered.

According to another embodiment, a system for increasing traffic in a shopping center comprises a housing having an evaluating area in communication with a vault. An evaluating device is configured to determine the composition of an item which has at least one of a precious stone, a semi-precious stone, a precious metal, and a semi-precious metal. Means are provided for associating an exchange value with the item using data from the evaluating device and market data obtained over a network, and also for exchanging the item for something of value.

According to another embodiment, a method for appraising an item at a retail location includes the step of providing a variety of articles at the retail location. The item has at least one of a precious stone, a semi-precious stone, a precious metal, or a semi-precious metal. Then, by a transaction point computer at the retail location, the item to be appraised is received, along with the consumer's selection of a food product. The item's composition is determined using an evaluating device, and an exchange value is associated with the item using data obtained by the evaluating device and market data obtained over a network. The exchange value of the item is relayed to the consumer after the food product selected by the consumer has been delivered. The consumer is allowed to relinquish his item in return for the exchange value.

According to yet another embodiment, a method of appraising an item having at least one of a precious stone, a semi-precious stone, a precious metal, or a semi-precious metal includes the steps of receiving the item, and receiving a selection of a food product from an electronic input device. The selected food product is delivered to a consumer. The composition of the item is determined using an electronic evaluating device. A computer processor is then employed to associate an exchange value with the item using data obtained by the evaluating device and market data obtained over a network. The exchange value of the item is then provided to the consumer, after the selected food product is delivered to the consumer.

BRIEF DESCRIPTION OF THE DRAWINGS

Illustrative embodiments of the present invention are described in detail below with reference to the attached drawings, wherein:

FIG. 1 depicts a schematic of a retail location, such as a fixed installation store and the like;

FIGS. 5 and 6A through 6C illustrate programming in the kiosk of FIG. 2 and methods of using the kiosk of FIG. 2.

DETAILED DESCRIPTION

The present invention is directed to a combination retailing system that offers a series of consumer goods, precious or semi-precious stones and metals, and ready to eat convenience food products at a single location. This combination retailing system also provides an avenue for customers to have their precious or semi-precious stones and metals appraised. Customers may utilize the time during which their precious or semi-precious stones and metals are being appraised to enjoy the variety of consumer goods and convenience food products made available by the combination retailing system. After the appraisal, the retailing system provides customers with the opportunity to trade or sell their precious or semi-precious stones and metals.

Figure 1:
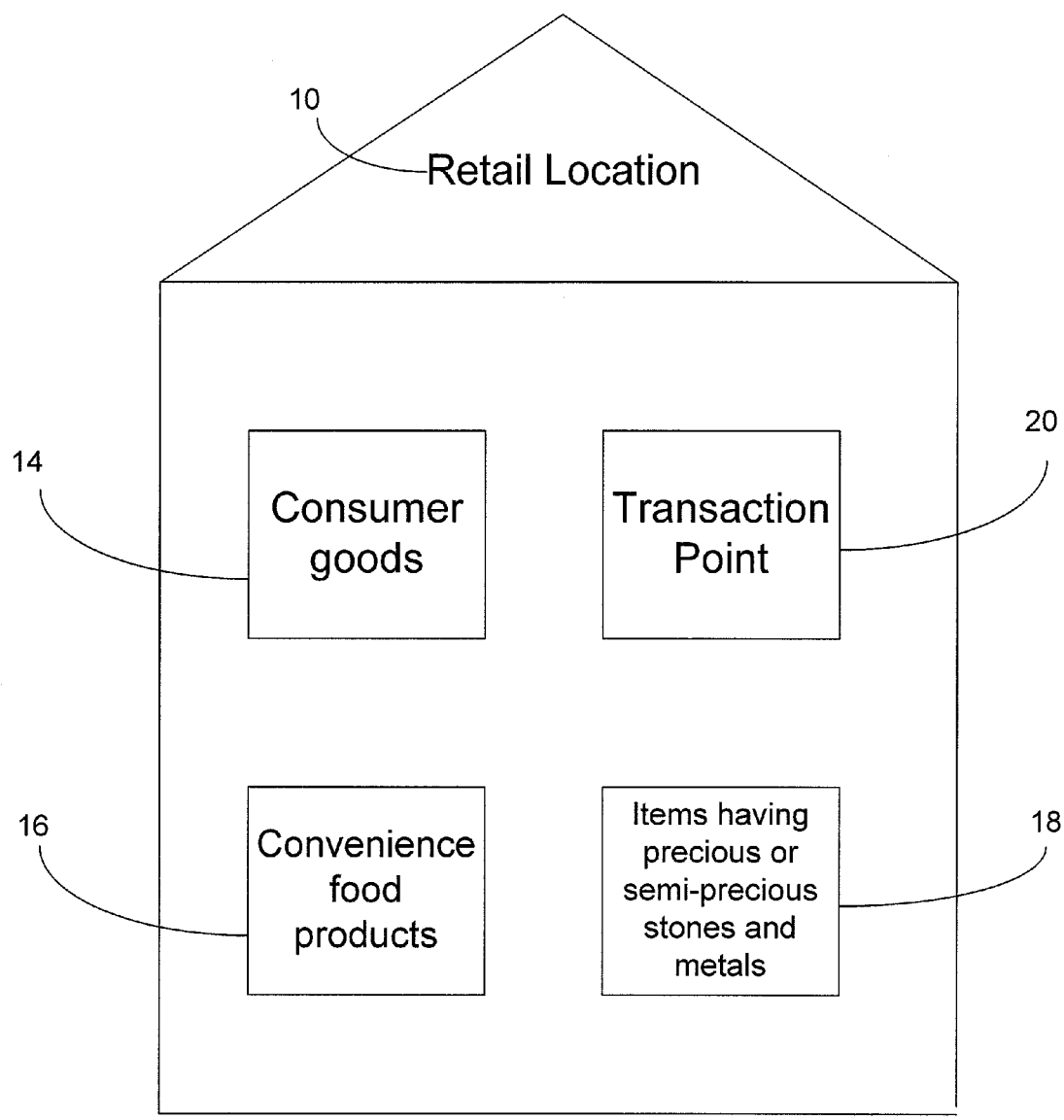

Reference is now directed to FIG. 1, which includes a schematic of a retail location (or "point-of-purchase") 10. The retail location 10 may carry a variety of consumer goods 14, which may include magazines, newspapers, health and beauty products, household items, seasonal or regional offerings, general retailing merchandize, et cetera, and convenience food products 16, which may include any product commonly consumed as food or drink, such as fast food items, chips, candy, fruit, juices, coffee, tea, organic foods, and the like. The retail location 10 may also carry valuable items 18 that include precious or semi-precious stones and metals, such as diamond necklaces, gold chains, silver bracelets, platinum rings, pearl earrings, bars or coins of gold, silver, or platinum, or a cut or uncut diamond, emerald, pearl, or other gem.

A transaction point 20 may be provided at the retail location 10. The transaction point 20 will be used by the customers to place one or more transactions for the consumer goods 14, convenience food products 16, and valuable items 18 being offered at the retail location 10. The transaction point 20 can include a sales person, a video display, such as a touch screen, computer terminal, telecommunications equipment, such as a telephone or facsimile machine or combinations of any of the foregoing.

Figure 2:
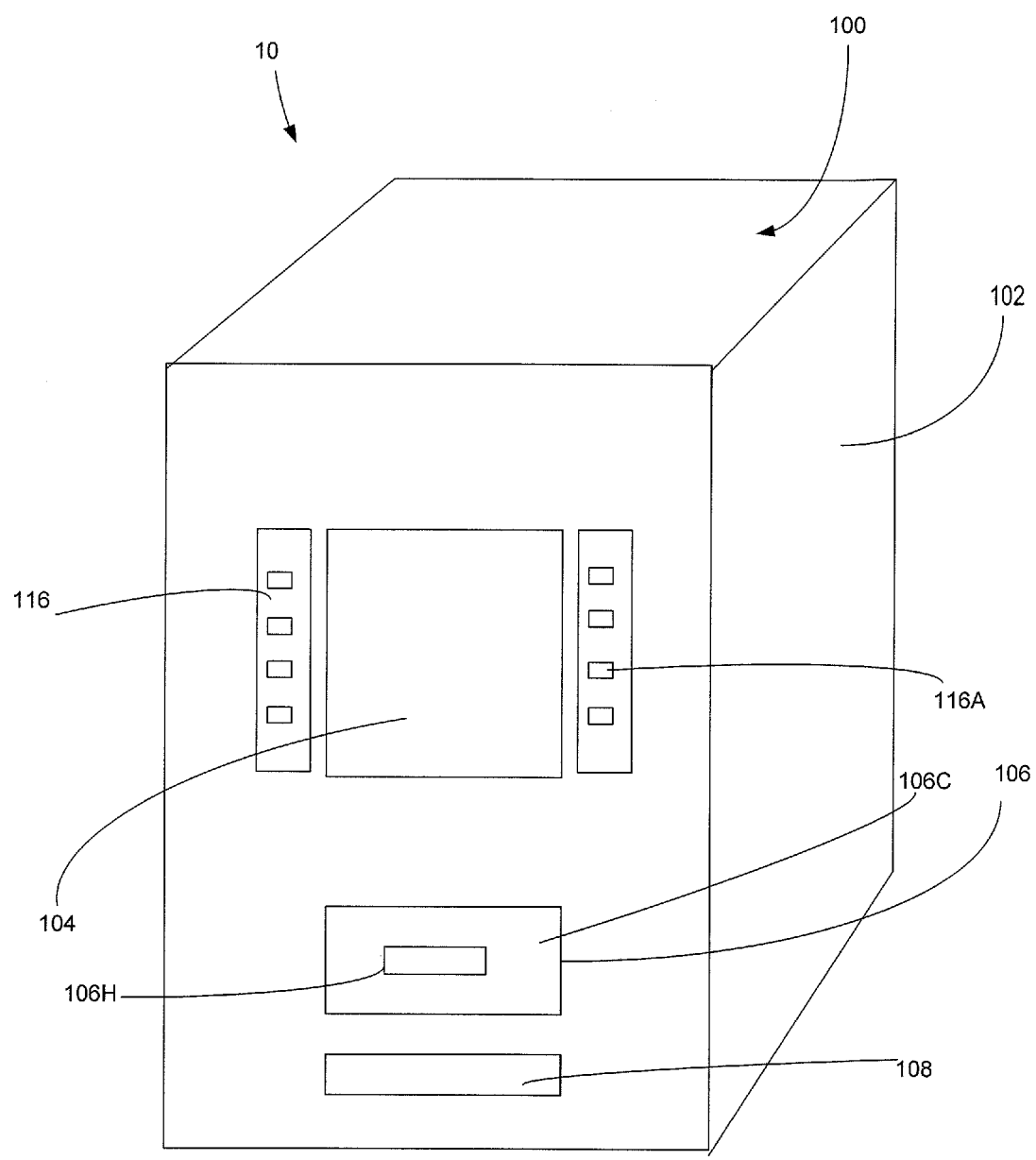
FIG. 2 is a perspective view of a kiosk according to one embodiment of the current invention.
Figure 3:
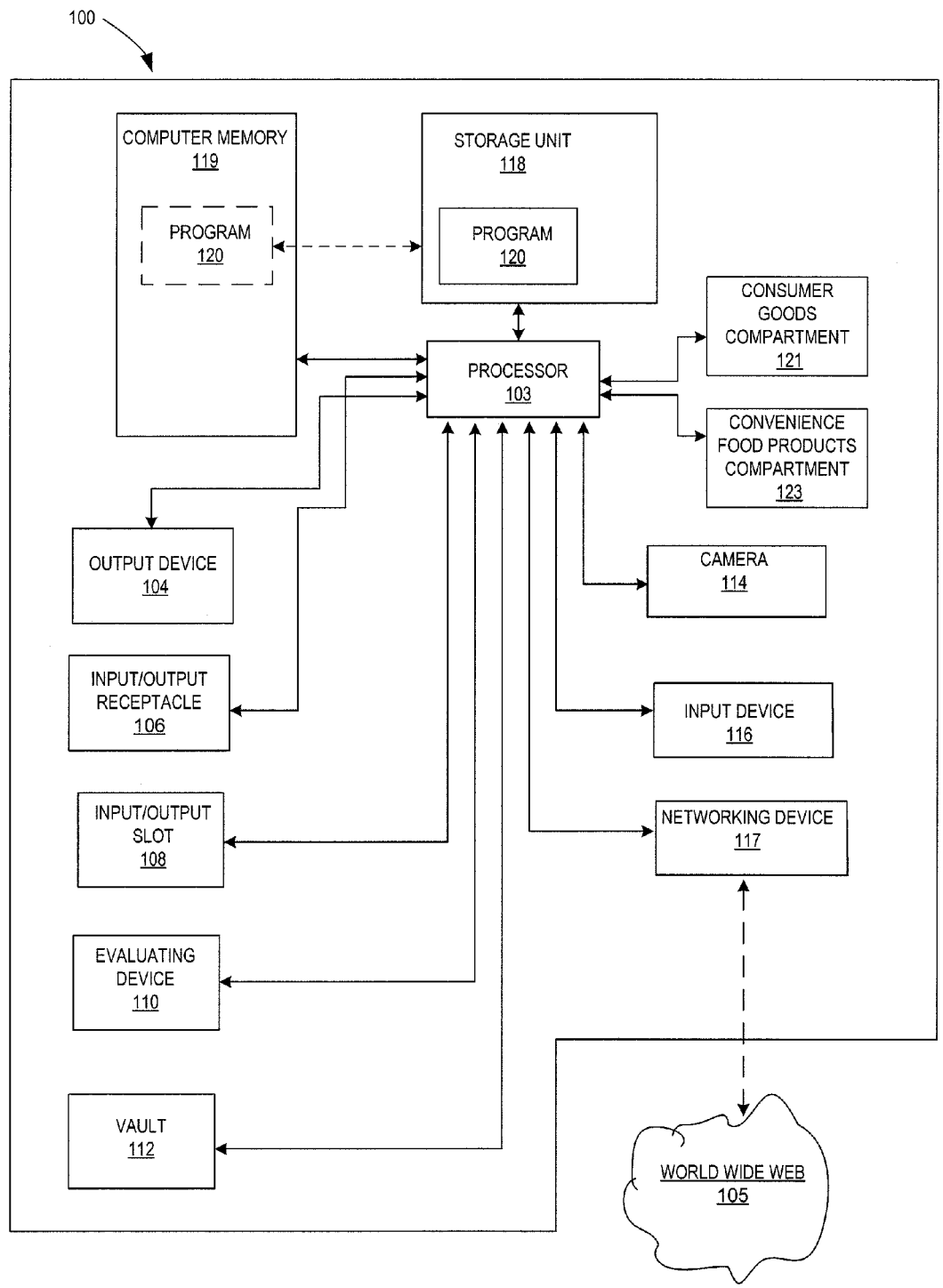
FIG. 3 shows the various elements of the kiosk of FIG. 2 and illustrates electronic communication.

The retail location 10 may be a fixed retail outlet, such as a store in an indoor or outdoor shopping mall or a standalone store, and as shown in FIG. 1, may have a series of walls, a floor, a roof, and other features commonly associated with a store. As shown in FIGS. 2 and 3, the retail location 10 may also comprise a kiosk 100 that can be assembled by or within a larger structure such as a shopping mall or department store and which provides a functional retailing system as described in the embodiments of the present invention. The kiosk 100 may be manually operated, or may be fully or partially automated.

According to one embodiment, the kiosk 100 includes an outer casing (or "housing") 102 and a processor 103 which may be in data communication with an output device 104, a input/output receptacle 106, an input/output slot 108, an evaluating device 110, a vault 112, a camera 114, an input device 116, a networking device 117, a compartment 121 for storing consumer goods 14, and a compartment 123 for storing convenience food products 16.

The kiosk 100 also includes a storage unit 118 and a computer memory 119 in data communication with the processor 103. The storage unit 118 may be, for example, a disk drive that stores programs and data, and the storage unit 118 is illustratively shown storing a program 120 embodying the steps and methods set forth below. It should be understood that the program 120 could be broken into subprograms and stored in storage units of separate computers and that data could be transferred between those storage units using methods known in the art. A dashed outline within the computer memory 119 represents the software program 120 loaded into the computer memory 119 and a dashed line between the storage unit 118 and the computer memory 119 illustrates the transfer of the program 120 between the storage unit 118 and the computer memory 119.

The output device 104 may be an LCD or Plasma type display screen, a printer, or any other appropriate visual and/or audible output device, whether currently available or later invented. It may be desirable for the input device 116 to be placed close to the output device 104, and the input device 116 may include various keys 116A to help in the navigation of various options 140 (discussed below). It will be understood that the shape and placement of the input device 116 and the keys 116A in FIG. 2 are exemplary only, and that the input device 116 may be placed further away from the output 104, or may include different types of keys 116A (e.g., keys displaying letters of the alphabet and numerals). In addition, the input device 116 in different embodiments may include switches, knobs, biometric sensors, and any other appropriate input devices, whether currently available or later invented. If the output device 104 is capable of allowing a customer to scroll through and navigate the various options 140 (e.g., touch screen capability), the output device 104 and the input device 116 may be a single device. Nevertheless, embodiments having an output device 104 with such capability and also a separate input device 116 are also contemplated.

The input/output receptacle 106 may be covered with a cover 106C to which a handle 106H is secured, and a customer may move the cover 106C (e.g., downwardly) by using the handle 106H to gain access to the receptacle 106. The receptacle 106 may alternatively be a drawer, which can be pulled out by the handle 106H. Regardless of its specific construction, the receptacle 106 may be configured to receive and/or dispense valuable items 18 such as precious or semi-precious stones and metals in various forms. The receptacle 106 may also be configured to dispense consumer goods 14 and convenience food products 16. Those skilled in the art will appreciate that the input/output receptacle 106 may be a single receptacle, as previously described, or may instead include multiple receptacles.

The input/output slot 108 may be configured to input and output cash, cards (e.g., gift cards, debit cards, credit cards, etc.), and/or promotional materials such as coupons and vouchers. The input/output slot 108 may be a single slot, or may instead include multiple transfer devices.

The evaluating device 110 is configured to evaluate the contents and price of the valuable item 18. The item 18 may, for example, be placed in the receptacle 106 by a customer, or may have been stored in the vault 112 after being placed in the receptacle 106 by a prior customer (or an owner or authorized attendant of the kiosk 100, et cetera). The evaluating device 110 may include a scale 131, and may employ various methods to determine the contents and price of an item 18, such as methods based on frequency testing, electrical conductivity, thermal conductivity, et cetera.

For instance, the evaluating device 110 may include an XRF (x-ray fluorescence) tester 132 which utilizes XRF to determine the types and quantity of metals present in an item 18. More particularly, the XRF tester 132 includes a source 132x, which can generate high energy, short wavelength protons (e.g., x-rays), and the item 18 is struck with these x-rays from the source 132x. The workings of the XRF-tester are explained here with reference to FIGS. 4A-4B.

Figure 4A:
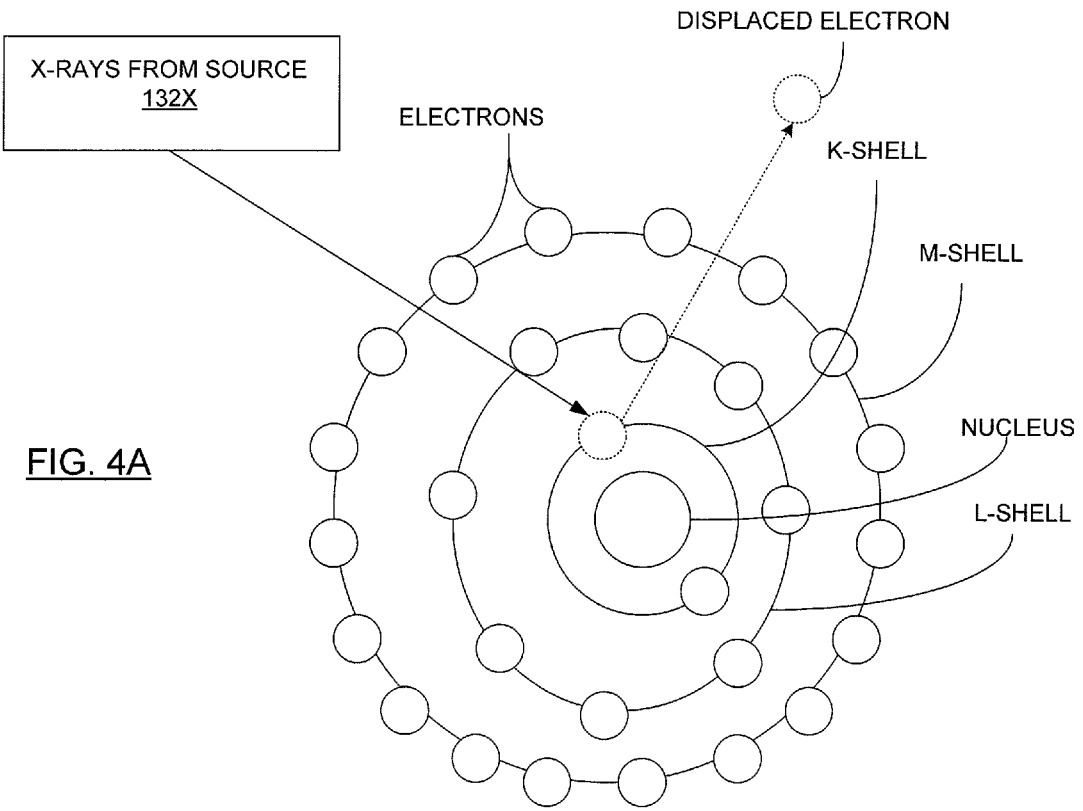
FIGS. 4A and 4B illustrate operation of one portion of the kiosk of FIG. 2.
Figure 4B:
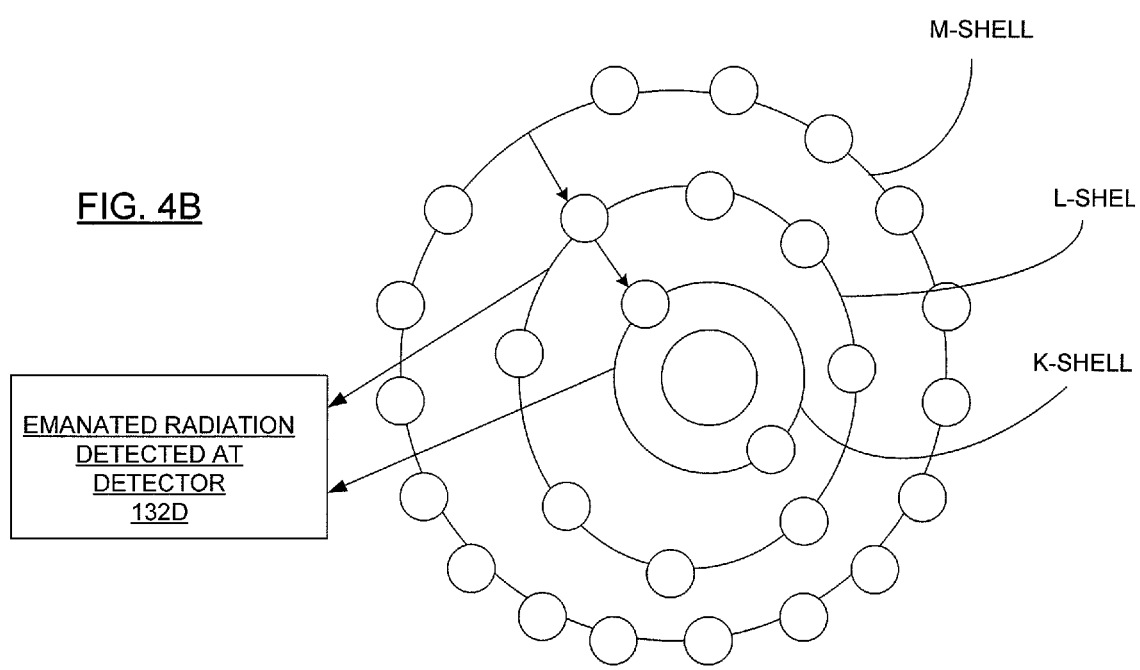

The item 18, much like other matter, is composed of atoms, which, at their center, have a nucleus (see FIG. 4A). Rotating around the nucleus, in orbits, are negatively charged particles, i.e., electrons. These electrons rotate in different orbits (or shells) around the nucleus, and an electron in one shell has a different energy than an electron in another shell. For example, electrons in the K-shell, which shell is closest to the nucleus, have the lowest energy, whereas electrons in the M-shell, which is further away from the nucleus, have higher energy. Similarly, electrons in the L-shell, which lies between the K-shell and the M-shell, have greater energy than the electrons in the K shell, but less energy than the electrons in the M-shell.

When the item 18 is exposed to radiation emanated by the source 132x, an electron in a low energy shell (e.g., the K-shell) is displaced; thereafter, an electron in a higher energy orbit (e.g., the L-shell) rushes to take its place in the low energy shell. Similarly, the electron in the comparatively higher energy orbit (e.g., the M-shell) rushes to take the place of the electron that has rushed to take the place of the electron originally displaced by the radiation. As there is less energy required to maintain the lower energy orbits, when an electron from a higher energy orbit, e.g., the M-shell, moves and takes the place of an electron in the L-shell, excess energy (i.e., L x-ray) is emitted. Similarly, when the electron in the L-shell takes the place of the electron in the K-shell, excess energy (i.e., K x-ray) is emitted, and so on. These x-rays (e.g., K, L, M, N x-rays) are unique to each metal, akin to a fingerprint, and can then be analyzed by a detector 132D, which compares these x-rays to the known values of various metals. The evaluating device 110 can thus determine the exact composition of the various metals in the item 18 with precision. For example, by using the scale 131 and the XRF tester 132, the evaluating device 110 may find that the item 18 contains one ounce (28.34 grams) of gold, and ten grams of silver.

The evaluating device 110 may then employ a different method to determine whether the item 18 also includes a precious stone. For example, the evaluating device 110 may employ an infrared reflectance meter, a refractometer, a diamond fluorescence machine, a spectroscope, or a combination of these and other known techniques along with the scale 131 to determine the contents, weight, and type of any precious or semi-precious stones that are included in the item 18. For illustrative purposes, consider that after analyzing the item 18, the evaluating device 110 gleans that in addition to the ounce of gold and ten grams of silver, the item 18 includes a diamond that weighs 1 carat (0.2 grams).

The next step entails pricing the item 18. The processor 103, via known communication methods, can access a network 105 (e.g., the Internet). Specifically, the processor 105 accesses one or more websites 105W, which may be dedicated solely to the kiosks 100, using the networking device 117. In some embodiments, the website 105W is password protected and the content on the website 105W is encrypted to prevent unauthorized access; in other embodiments, the website 105W may be a publicly-available site that is not dedicated to the kiosks 100. The website 105W may include the price of each precious or semi-precious gemstone and metal, and may be updated regularly (e.g., daily) by authorized persons to reflect the current rates. The website 105W may also keep track of the area at which a particular kiosk 100 is located, as the price of gemstones and metals often varies with location.

So, for example, the processor 103 of a particular kiosk 100 may determine via the website 105W that the current rate of a diamond in the locality of the kiosk 100 is $1,000 per carat, the current rate of gold is $1,500 per ounce, and that the current rate of silver is 10 cents per gram. The processor 103 may then calculate (using the composition determined by the evaluating device 110) that the item 18 is worth about $2,501, and after deducting certain processing fees, may display the worth of the item 18 on the output device 104.

In some embodiments, the determined worth may be confirmed by using the camera 114; specifically, the camera 114, which may be a digital video (or still) camera, may make an image 136 of the item 18 and securely transmit the image 136 over the web 105. The image 136 may then be viewed by a jeweler or other person via the website 105W or some other website. The jeweler may then confirm that the readings taken by the evaluating device 110 are (or appear to be) correct, and may also modify the worth of the item 18. For example, the jeweler may lower the calculated worth of the item 18 upon finding that the diamond associated with the item 18 has inclusions which were not accounted for, or that the diamond is colored or has some other defect. Or, the jeweler may increase the calculated worth of the item 18 upon finding, for example, that the item 18 is associated with a particular brand.

If such remote valuation methods are employed, a customer may be able to communicate with the jeweler about the specifics of the item 18 by using the input device 116, output device 104, and camera 114; for example, the camera 114 may take a video 136 of the customer and cause it to be transmitted, whereby the video 136 may be viewed, generally simultaneously, by the jeweler. Or, the kiosk 100 may allow two-way video communication between the customer and the jeweler by displaying the jeweler on the output device 104. Or, the customer may instead utilize a telephone number to call the jeweler and discuss any concerns about the calculated worth of the item 18.

After deducting fees (20% for this example, and which may also include a factor of safety to ensure that the item is worth more than the evaluation) from the calculated worth, the offered price (now $2,000.80 in the current example) is displayed on the output device 104, and the customer may choose to sell the item 18. If so, the customer may navigate the input device 116, and the stated amount (again, $2,000.80 in the current example) may be dispensed by the kiosk 100 via the input/output slot 108C.

The item 18 may be stored in the vault 112. The vault 112 may be partitioned into various areas and may be fully encompassed by the casing 102, or may extend into a secure room or other structure through the back or a side of the kiosk 100. The vault 112 may include one or more safety mechanisms to ensure that the vault 112 is accessible only to authorized persons, and may include a hidden GPS device in case anyone attempts to improperly relocate the entire kiosk 100 or the vault 112.

Valuation of the item 18 as discussed above may take some time, and a customer getting an item 18 appraised may wish to utilize this time. Preferably, thus, a customer using the retail location 10 (e.g., kiosk 100) to get his item 18 valuated will also, at the transaction point 20, purchase a convenience food product 16, which the customer may consume while the appraisal is being conducted; or, the customer may instead purchase a consumer good 14 such as a magazine which the customer can browse through while waiting for the valuation to complete. In this manner, the retailing system provides a convenient and efficient manner in which to provide a valuable service to a customer without delaying or interrupting his schedule.

The consumer goods 14 may be stored inside the kiosk 100 within a compartment 121, and the convenience food products 16 may be stored within a compartment 123 (see FIG. 3). A heating or cooling element may be associated with the compartment 123 for storing and/or dispensing the convenience food products 16 at a desirable temperature. A person skilled in the art will understand that the compartments 121 and 123 for storing consumer goods 14 and convenience food products 16 respectively may be single compartments, or may comprise a plurality of compartments.

The outer casing 102 of the kiosk 100 may be such that a customer is able to view the contents of one or both compartments 121, 123 directly, or the contents of the compartments 121, 123 may be displayed on the output device 104 by the processor 130. The customer may be allowed to select a consumer good 14 and/or convenience food product 16 via the input device 116, and the consumer good 14 or convenience food product 16 may be dispensed for the customer by the kiosk 100 through the input/output receptacle 106. Where some or all of the convenience food products 16 are not conducive to being dispensed via the input/output receptacle 106 (for e.g., coffee), the kiosk 100 may include a separate dispensing unit to dispense such food products 16. It is also possible for the consumer goods 14 or food products 16 to be stored at a remote location (e.g., at a store or restaurant that is within a half hour drive from the retail location 10), and for them to be delivered to the retail location 10 after the customer has made his selection via the input device 116.

Attention is now directed to FIGS. 5 and 6A-6C, which illustrate programming in the kiosk 100 and methods of using the kiosk 100. In these illustrations, the kiosk 100 is placed, preferably conspicuously, in a mall or shopping area that has at least three stores, i.e., store 1, store 2, and store 3.

Figure 5:
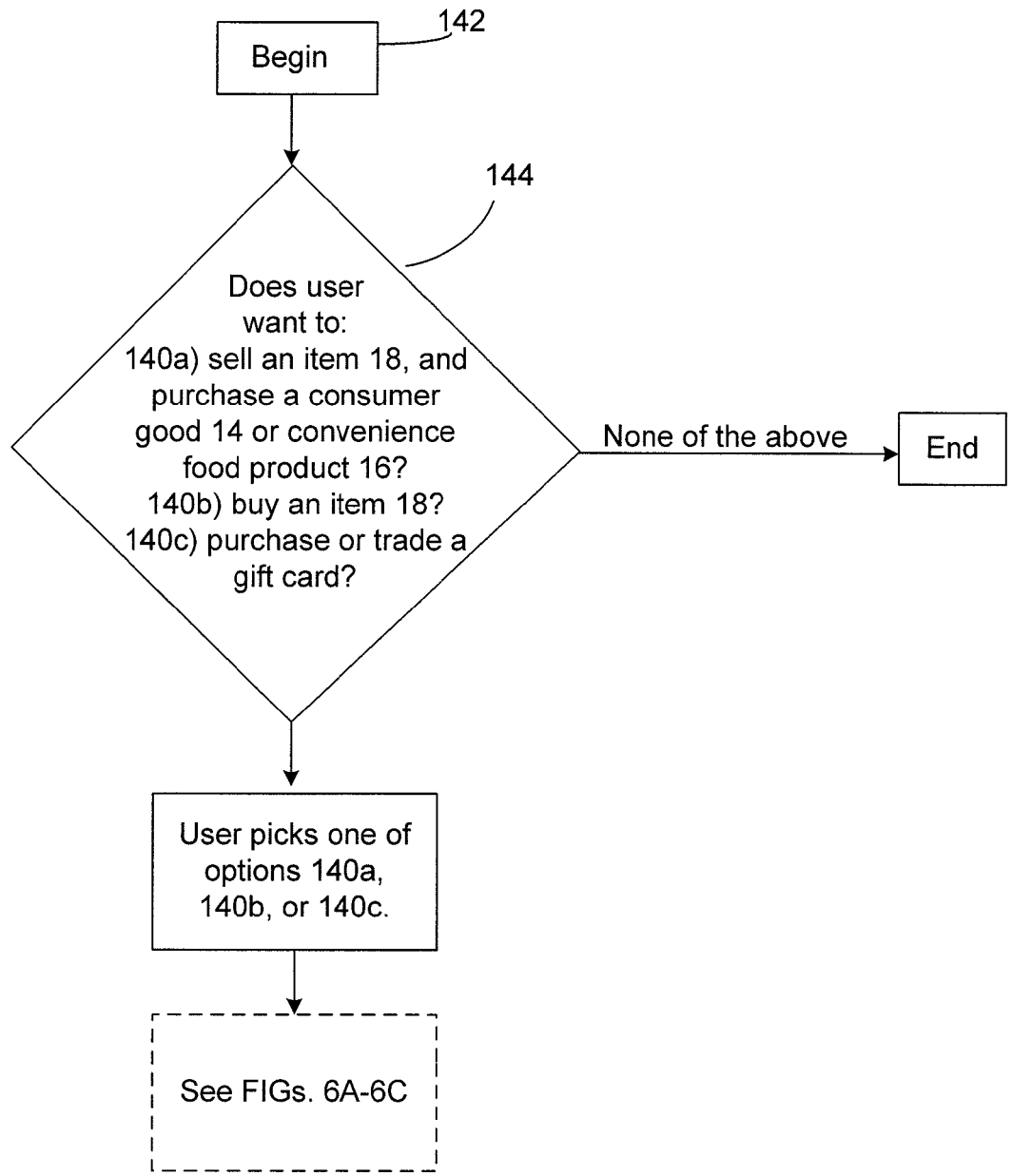
Figure 6B:
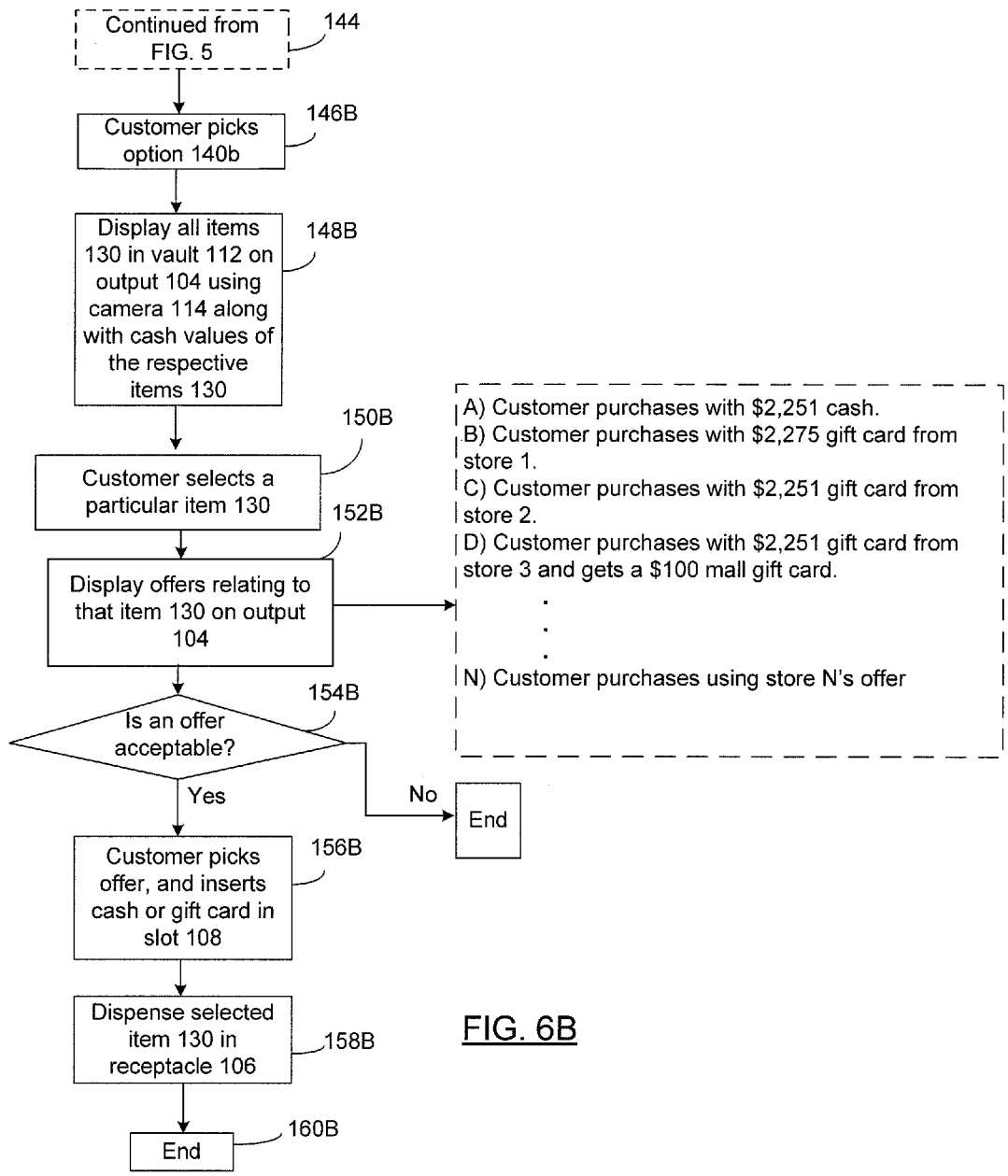
Figure 6C:
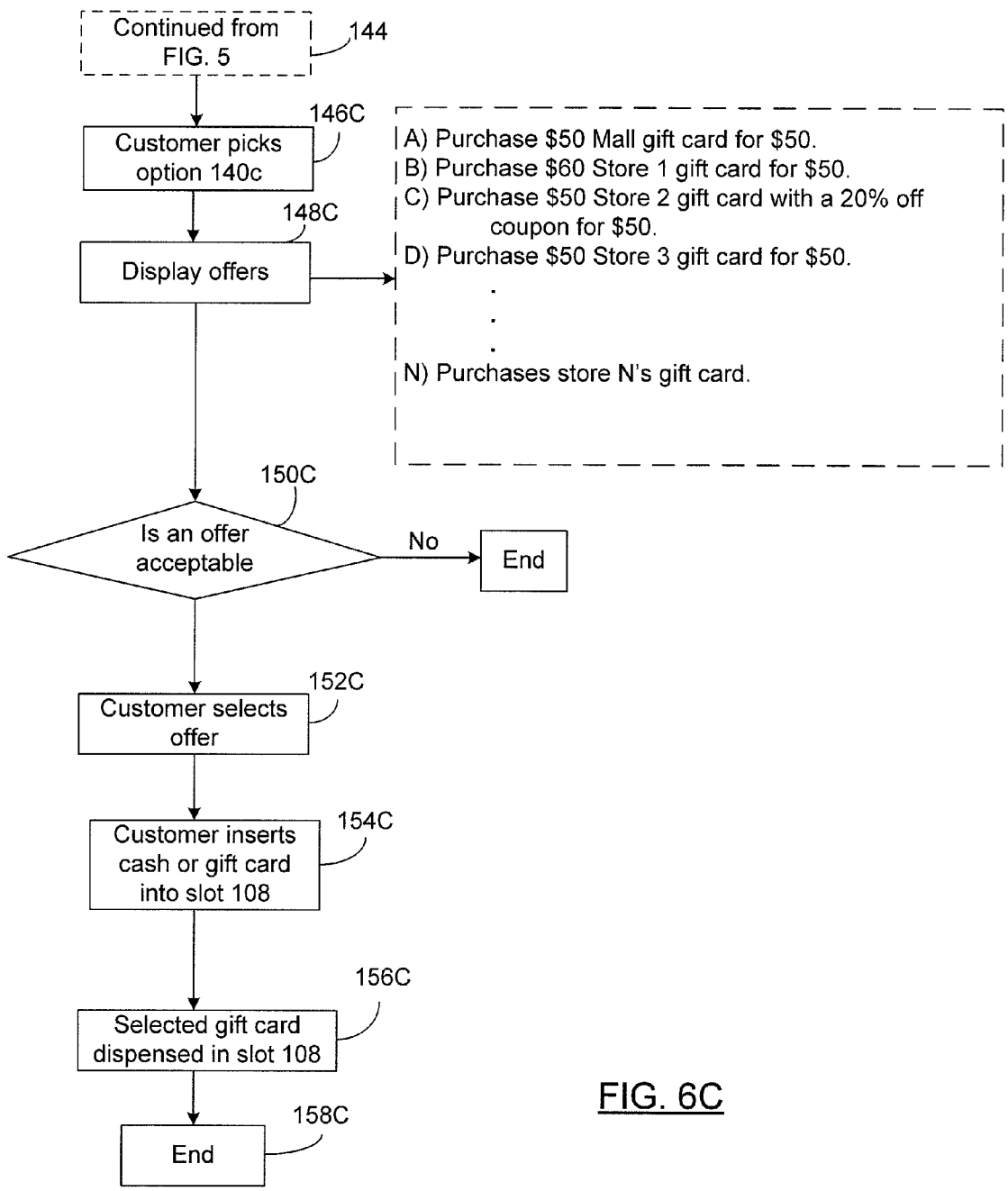

As shown in FIG. 5, at step 142, a customer enters the shopping area and approaches the retail location 10 (i.e., kiosk 100 in this example). At step 144, the kiosk 100, via its output device 104, inquires whether the customer is interested in selling an item 18 and purchasing a consumer good 14 or convenience food product 16 (option 140a), buying an item 18 (option 140b), or purchasing or trading a gift card (option 140c). FIG. 6A shows selection of option 140a, FIG. 6B shows selection of option 140b, and FIG. 6C shows selection of option 140c.

By selecting option 140a at step 146A (FIG. 6A), the customer signifies that he intends to sell an item 18, and wants to purchase a consumer good 14 or convenience food product 16. The item 18 may be any item that includes a precious or semi-precious stone or metal, or any item 18 that the customer thinks may include a precious or semi-precious stone or metal. At step 148A, the customer places his item 18 in the receptacle 106. Then, at step 150A, the customer is asked, via the output device 104, whether he wants to purchase a consumer good 14 or a convenience food product 16. At step 152A, the kiosk 100 dispenses the consumer good 14 or convenience food product 16 in line with customer's entry, which the customer may make using the input device 116. The customer may also choose to purchase both a consumer good 14 and a convenience food product 16, or a plurality of either.

At step 154A, the item 18 is evaluated by the evaluating device 110 to determine the contents of the item 18. Specifically, the evaluating device 110 may run one or more tests to determine the composition of the item 18, such as an X-ray fluorescence test by using its XFR tester 132 to determine the presence and composition of any precious or semi-precious metals, and/or tests for precious or semi-precious stones by using the spectroscope. The processor 103 may also ask the customer to input (via input 116) which metals and/or stones the customer want the item 18 to be tested for, and the evaluating device 110 may conduct only the tests pertaining to those metals and stones.

In some embodiments, the processor 103 (and software program 120) may cause the camera 114 to take video 136 (or snapshot) of the item 18 and stream the video 136 (or send the snapshot) over the internet 105, such that the video 136 (or snapshot) can be viewed by a jeweler or other qualified person. This may especially be useful where the tests conducted by the kiosk 100 provide inconsistent results or where the evaluating device 110 indicates that the item 18 is worth more than a predetermined amount, so that the jeweler can verify the worth of the item 18. It is also possible to instead have an attendant on hand that can verify the price of each item 18 and address any concerns of the customer, or for the kiosk 100 to simply refuse any transactions over a predetermined amount. Or, a phone number may be listed on the casing 102 of the kiosk 100 or displayed on the output device 104, allowing a customer to call that number and discuss any general or specific concerns.

Once the evaluating device 110 determines the specific composition of the item 18, the processor 103 may then communicate with the website 105W to determine the current unit price of each constituent metal or stone present in the item 18 in the locality of the kiosk 100. As with the example above, it may be determined that the item 18 has a one carat diamond, an ounce of gold, and 10 grams of silver, and as such, the processor 103 may calculate the item 18 to be worth about $2,501. The processor 103 may then deduct a standard amount or percentage and display on the output 104 the cash amount (e.g., $2,000.80) that the kiosk 100 is willing to pay for the item 18.

As the kiosk 100 additionally has the capability to dispense gift cards, the mall and the stores therein may compete with each other to entice the customer to, instead of cash, accept a gift card from the mall or a store. For example, the mall may offer the customer a gift card for $2,050-$49 more than what the kiosk 100 offers the customer in cash. The customer may consider the additional $49 to be worthwhile, especially because the mall gift card may be utilized at any store in the mall; for instance, the customer may rationalize that since the mall gift card has no imminent expiration date, and that the customer will have to spend cash anyway to purchase items of use (such as clothing, food, gifts, et cetera), that it is a better deal to take the higher value gift card than the cash. If the customer accepts the mall gift card, it would increase the likelihood that the customer would come to the mall again to shop, something which the customer may not have done otherwise. Thus, the presence of the kiosk 100 may entice a customer to come to the shopping area to conveniently sell an item 18, whether for cash or a gift card. And once a customer is at the shopping area to utilize the kiosk 100, the customer may shop at the shopping area after (or before) using the kiosk 100, even if he did not originally intend to do so.

There is no requirement that the mall gift card be priced higher than the cash value of the item 18, and if it is not, the customer may purchase the mall gift card nevertheless, perhaps as a gift, or because it is safer to carry the mall gift card than cash. The mall gift card may also extend to other malls or stores; this may especially be helpful when the kiosk 100 is placed in a store that has a chain of stores. For example, where the kiosk 100 is placed in a Walmart® store, a Bass Pro Shops® store, a Cabela's® store, or a gas station chain, the gift card may extend to all of these respective stores nationwide, or even internationally. Or, certain gift cards may extend to a particular grouping of stores, and also to restaurants, dry cleaning services, bars, salons, et cetera, allowing for a safe and convenient alternative to cash at many of the places that the customer frequents.

The stores within the mall may also (but do not have to) compete with each other to entice the customer to accept their gift card in return for the item 18, and may provide varying incentives to the customer. For example, store 1 may provide a gift card that is worth $2,501, i.e., the actual worth of the item 18 before the processing fee was subtracted, and thereby, agree to absorb the processing fee of the kiosk 100 on behalf of the customer, in return for the opportunity to have the customer shop at store 1. Store 2 may, for example, offer a store 2 gift card for $2,000.80 but add a 20% off coupon as an incentive. These offers will generally be determined in advance, may be changed from time to time, and may vary from kiosk 100 to kiosk 100. Again, however, there is no requirement that a store provide any additional incentives, and as such, store 3 may offer a gift card for $2,000.80, i.e., for the same amount that the kiosk 100 would dispense in cash.

At step 156A, all these offers may be displayed on the output device 104, and at step 158a, the kiosk 100 may inquire as to which offer the customer wants to take advantage of. If the customer picks an offer at step 160A, the kiosk 100 (and more specifically the processor 103 along with program 120) may first cause the item 18 to be secured in the vault 112 at step 162A. This ensures that the customer is unable to retrieve the item 18 after he has made the decision to accept an offer. The kiosk 100 may then, at step 164A, dispense the cash or gift card as selected by the customer in the slot 108, where it can be picked up by the customer. The kiosk 100 may also have the capability to dispense, instead of a gift card that is associated with a particular mall or chain, a debit card that can be used by the customer at any location that accepts debit cards. Or, if the customer desires, the kiosk 100 may transfer the funds electronically to the customer's bank account, or on the customer's behalf, to an interne retailer such as Amazon.com®. Similarly, the kiosk 100 may have the capability to transfer the funds to eBay® (e.g., via the customer's account at PayPal®), or to any other web based account where the funds can subsequently be accessed by the customer or a third party.

Returning now to step 144, if instead of attempting to sell an item 18, the customer wants to purchase an item 18, which item 18 may have been left in the kiosk 100 (i.e., the vault 112) by a prior customer, or an owner of the kiosk 100 or other authorized person, the customer selects option 140b at step 146B (FIG. 6B). The customer may for example be enticed to come to the kiosk 100 to purchase the item 18, instead of going to a jewelry or other store, because the item 18 may be offered at a lower price than it is elsewhere, as the cost of overhead of the kiosk 100 may be lower than that of stores; or, the customer may want to purchase an item 18 immediately (for e.g., as a gift for a party that night), and come to the kiosk 100 because the jewelry stores in the area have closed for the day. Or, for example, the customer may come to the kiosk 100 because the kiosk 100 may allow the customer to pay for an item 18 via a gift card, or because of the location of the kiosk 100.

After the customer selects option 140b at step 146B (FIG. 6B), the processor 103 at step 148B, by using the camera 114, may cause all the items 18 in the vault 112 to be displayed on the output 104 along with their prices in cash, which may have been pre-determined by the evaluating device 110, or may have been set in advance by an owner or authorized user of the kiosk 100. Once the customer selects a particular item 18 at step 150B, the kiosk 100 displays on display 104 the various offers relating to that item 18 at step 152B. These offers may include, for example, an offer from store 1 allowing the customer to purchase the item 18, which has a cash value of $2,251, with a gift card from store 1 for $2,275, and the customer, in his desire to utilize the gift card, may agree to this offer. Store 2 may offer that the customer purchase the item 18 with a gift card having the same cash value as the item 18, and store 3 may offer a $100 mall gift card if the customer purchases the item with a store 3 gift card worth $2,251. As discussed with respect to option 140a, there is no requirement that the offers from the stores be different, or even that every or any store in the shopping area participate in making the offers. Indeed, the kiosk 100 may be used inside a single retail store and only provide or accept gift cards from that store (though provided gift cards may be used in subsequent transactions to purchase different gift cards). A person skilled in the art will appreciate that the offers discussed with respect to the options 140, as well as the processing fees discussed herein are only exemplary.

If an offer is acceptable to the customer at step 154B, the customer picks the desired offer at step 156B and inserts into the slot 108 the cash or gift card according to the offer. This cash or gift card may also be secured in the vault 112 or a different secure area. Upon securing the cash or gift card, the kiosk 100 dispenses the desired item 18 into the receptacle at step 158B, thereby completing the transaction at step 160B. It will be appreciated by those skilled in the art that in addition to selling or buying an item 18 under options 140a, 140b respectively, the kiosk 100 may also, after deducting its fees, allow the customer to trade his item 18 for other item(s) 18 of comparable value.

Returning again to step 144, the kiosk 100 may in some embodiments also be used as a hub for buying gift cards relating to at least one store. For example, if the customer picks option 140c at step 146C (FIG. 6C), then at step 148C the kiosk 100 may display any or all offers relating to gift cards for cash. As before, the mall and the stores therein may compete with each other to entice the customer to purchase their gift card, by providing, for example, extra cash value for a gift card, or coupons or other incentives along with the gift card. Once a customer determines that an offer is acceptable at step 150C and selects an offer at step 152C, the customer inserts cash into the slot 108 at step 154C.

The kiosk 100 may also allow the customer to exchange a gift card from one store for a gift card from another store; for example, store 1 (or the mall) may offer to give a customer a gift card from store 1 (worth, e.g., $40) in exchange for a gift card from store 2 (worth, e.g., $50). Store 1 may then sell the gift card from store 2 via the kiosk 100 to another customer, and by virtue of the gift card from store 1, increase the likelihood that the customer will subsequently shop at store 1. The process ends at step 158C after the kiosk 100, at step 156C, dispenses the gift card selected by the customer.

The kiosk 100, thus, may allow a customer to conveniently have an item 18 having a precious or semi-precious metal or stone appraised and sold while providing the customer with avenues to utilize the time spent during the appraisal productively, to buy or trade an item 18, to buy a gift card for cash, or to exchange a gift card.

While the kiosk 100 has been detailed here in FIGS. 5 and 6A through 6C as being within a mall or shopping area, a person skilled in the art will appreciate that the kiosk 100 may be placed at any point-of-purchase, or at any other area that has high traffic or that has potential to attract high traffic. For example, the kiosk 100 may be placed within or outside a gas station, and may be integrated with the payment mechanisms utilized by the gas station. And, to illustrate, a customer having an item 18 for which the kiosk 100 is willing to pay $50 may utilize the kiosk 100 to pay $25 for gas and $5 for a convenience food product 16, and obtain the remaining $20 from the kiosk 100 in the form of a secure debit card that the customer can subsequently use at any location that accepts debit cards. It is also possible to place different types of kiosks 100 in proximity to each other to create an appraisal area 170. For example, a kiosk 100 that evaluates valuable items 18, dispenses consumer goods 14 and/or food products 16, and enables a user to trade his item 18 for another item 18 (or cash or gift cards et cetera) may be placed within one square mile of a kiosk 101 that has the ability to evaluate valuable items 18 and which enables a user to trade his item 18 for something of value, but which does not carry or dispense food products 16 or consumer goods 14.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:
1. A method for appraising an item at a retail location, the method comprising the steps of:
   (a) providing a variety of food products at the retail location;
   (b) by a transaction point computer at the retail location:
      (i) physically receiving the item to be appraised from a consumer, the item having at least one constituent selected from the group consisting of a precious stone, a semi-precious stone, a precious metal, and a semi-precious metal;

(ii) in response to physically receiving the item to be appraised from the consumer, automatically asking the consumer via an output device to select for purchase a food product;
(iii) receiving the selection of the food product for consumption by the consumer at the retail location;
(iv) delivering the selected food product to the consumer;
(v) determining a composition of the item using an evaluating device;
(vi) associating an exchange value with the item using data obtained by the evaluating device and market data obtained over a network; and
(vii) relaying the exchange value of the item to the consumer;
wherein the delivery of the food product occurs prior to the relaying of the exchange value.

2. The method of claim 1, wherein the retail location comprises a kiosk that encompasses the transaction point computer.

3. The method of claim 2, further comprising the step of exchanging the item at the kiosk in return for a payment; and
wherein the payment is dependent on the exchange value of the item.

4. The method of claim 3, wherein the payment is in a form selected from the group consisting of a debit card, a gift card, and cash.

5. The method of claim 4, wherein:
(a) the kiosk is placed within a shopping center having at least a first store and a second store; and
(b) the first store provides an incentive to the consumer for relinquishing his item in return for a gift card from the first store.

6. The method of claim 5, wherein the incentive includes an offer by the first store to absorb a processing fee associated with the kiosk.

7. The method of claim 6, wherein the second store provides a competing incentive to entice the consumer to relinquish his item in return for a gift card from the second store.

8. The method of claim 1, wherein the evaluating device uses at least one evaluating technique selected from the group consisting of frequency testing, thermal conductivity testing, electrical conductivity testing, spectroscopy, and infrared reflectance.

9. The method of claim 8, wherein the evaluating technique is selected based on an input by the consumer.

10. The method of claim 1, wherein the evaluating device comprises an x-ray fluorescence tester having a source and a detector.

11. The method of claim 1, wherein the market data obtained over the network is specific to a predetermined geographical location.

12. The method of claim 2, further comprising the step of allowing the consumer to trade his item with another item having a comparable exchange value.

13. The method of claim 12, further comprising the step of having a jeweler remotely validate the exchange value of the item.

14. The method of claim 4, wherein:
the payment is a gift card associated with a first store; and
the consumer is allowed to exchange the gift card with a gift card associated with a second store.

15. A system for increasing traffic in a shopping center, the system comprising:
a transaction point computer at a retail location configured to:
appraise an item physically received from a consumer, the item having at least one constituent selected from the group consisting of a precious stone, a semi-precious stone, a precious metal, and a semi-precious metal; wherein appraising the item includes:
(a) determining a composition of the item using an evaluating device; and
(b) associating an exchange value with the item using data obtained by the evaluating device and market data obtained over a network;
in response to physically receiving the item to be appraised from the consumer, automatically ask the consumer via an output device to select for purchase a food product;
receive a selection of the food product for consumption by the consumer at the retail location;
deliver the selected food product to the consumer;
relay the exchange value of the item to the consumer; and
exchange the item for a something of value;
wherein the transaction point computer is further configured to deliver the food product prior to relaying the exchange value.

16. The system of claim 15, wherein the something of value is at least one of: an item with an associated exchange value, a gift card, a debit card, and cash.

17. The system of claim 16, wherein the system further comprises a store within a shopping center.

18. The system of claim 17, further comprising a means for a two-way video conference; and wherein the means for the two-way video conference is utilized to validate the exchange value of the item.

19. A method for appraising an item at a retail location, the method comprising the steps of:
(a) providing a plurality of consumer goods at the retail location;
(b) by a transaction point computer at the retail location:
(i) physically receiving the item to be appraised from a consumer, the item having at least one constituent selected from the group consisting of a precious stone, a semi-precious stone, a precious metal, and a semi-precious metal;
(ii) in response to physically receiving the item to be appraised from the consumer, automatically asking the consumer via an output device to select for purchase a consumer good;
(iii) receiving a selection by the consumer of the consumer good;
(iv) delivering the selected consumer good to the consumer;
(v) determining a composition of the item using an evaluating device;
(vi) associating an exchange value with the item using data obtained by the evaluating device and market data obtained over a network;
(vii) relaying the exchange value of the item to the consumer; and
(c) exchanging the item in return for the exchange value;
wherein the delivery of the consumer good occurs prior to the relaying of the exchange value.

* * * * *